(12) United States Patent
Higashiyama et al.

(10) Patent No.: US 8,590,604 B2
(45) Date of Patent: Nov. 26, 2013

(54) DOUBLE-WALL-TUBE HEAT EXCHANGER

(75) Inventors: Naohisa Higashiyama, Oyama (JP); Hokuto Mine, Oyama (JP)

(73) Assignee: Showa Denko K.K., Tokyo (JP)

( * ) Notice: Subject to any disclaimer, the term of this patent is extended or adjusted under 35 U.S.C. 154(b) by 800 days.

(21) Appl. No.: 12/801,821

(22) Filed: Jun. 28, 2010

(65) Prior Publication Data
US 2010/0326640 A1 Dec. 30, 2010

(30) Foreign Application Priority Data

Jun. 30, 2009 (JP) ................................. 2009-155333

(51) Int. Cl.
*F28D 7/10* (2006.01)
*F28D 7/12* (2006.01)

(52) U.S. Cl.
USPC ........................................... 165/154; 165/141

(58) Field of Classification Search
CPC ....................................................... F28D 7/10
USPC ............................. 165/160, 155, 154, 141, 90
See application file for complete search history.

(56) References Cited

U.S. PATENT DOCUMENTS

| | | | | |
|---|---|---|---|---|
| 1,400,179 | A * | 12/1921 | Pfeiffer | 165/141 |
| 2,076,903 | A * | 4/1937 | Levitt | 165/154 |
| 3,566,615 | A * | 3/1971 | Roeder, Jr. | 62/511 |
| 3,828,851 | A * | 8/1974 | Takayasu | 165/165 |
| 4,194,560 | A * | 3/1980 | Matsuzaki | 165/141 |
| 4,351,389 | A * | 9/1982 | Guarnaschelli | 165/141 |
| 4,373,578 | A * | 2/1983 | Saperstein et al. | 165/141 |
| 4,924,838 | A * | 5/1990 | McCandless | 123/541 |
| 7,293,603 | B2 * | 11/2007 | Cox | 165/156 |

FOREIGN PATENT DOCUMENTS

JP 2006-162238 A 6/2006

* cited by examiner

*Primary Examiner* — Tho V Duong
(74) *Attorney, Agent, or Firm* — Edwards Wildman Palmer LLP

(57) ABSTRACT

A double-wall-tube heat exchanger has outer and inner tubes. A clearance between the outer and inner tubes and the interior of the inner tube serve as refrigerant flow paths. Opposite end portions of the inner tube project from opposite ends of the outer tube. The outer tube includes expanded portions formed near the opposite ends. Contracted portions are formed on the outer tube to be located on the outer sides of the expanded portions, and are brazed to the inner tube. Longitudinally extending ridges project radially inward from the inner circumferential surface of the outer tube at predetermined circumferential intervals. The ridges on the inner circumferential surfaces of the expanded portions and the contracted portions are crushed. The clearances between the inner tube and portions of the contracted portions of the outer tube where the ridges are not formed are filled with a brazing filler metal.

8 Claims, 10 Drawing Sheets

DOUBLE-WALL-TUBE HEAT EXCHANGER

BACKGROUND OF THE INVENTION

The present invention relates to a double-wall-tube heat exchanger and, more particularly, to a double-wall-tube heat exchanger which has an outer tube, and an inner tube provided in and spaced apart from the outer tube.

Herein, the term "condenser" refers to not only an ordinary condenser but also a subcooling condenser, which has a condensing section and a supercooling section.

A conventionally proposed refrigeration cycle for use in a car air conditioner includes a compressor; a condenser having a condensing section and a supercooling section; an evaporator; an expansion valve serving as a pressure-reducing device; a vapor-liquid separator; and an intermediate heat exchanger disposed between the condenser and the evaporator and adapted to perform heat exchange between a high-temperature refrigerant from the supercooling section of the condenser and a low-temperature refrigerant from the evaporator (see Japanese Patent Application Laid-Open (kokai) No. 2006-162238). In the refrigeration cycle described in the publication, the refrigerant which has been supercooled in the supercooling section of the condenser is further cooled in the intermediate heat exchanger by the low-temperature refrigerant from the evaporator. By this procedure, the cooling performance of the evaporator is improved.

The intermediate heat exchanger used in the refrigeration cycle described in the above-mentioned publication is a double-wall-tube heat exchanger which has an outer tube, and an inner tube disposed in and spaced apart from the outer tube. A clearance between the outer tube and the inner tube serves as a high-temperature refrigerant flow path through which the high-temperature refrigerant from the condenser flows, and the interior of the inner tube serves as a low-temperature refrigerant flow path through which the low-temperature refrigerant from the evaporator flows. Opposite end portions of the inner tube project from opposite end portions of the outer tube. Expanded portions are formed on the outer tube near the opposite ends thereof. A refrigerant inflow pipe which communicates with the refrigerant flow path between the outer tube and the inner tube is connected to one expanded portion, and a refrigerant outflow pipe which communicates with the refrigerant flow path between the outer tube and the inner tube is connected to the other expanded portion. Contracted portions are formed on the outer tube to be located on the outer sides of the expanded portions without respect to the longitudinal direction thereof, and are brazed to the inner tube.

Incidentally, in the case where the refrigeration cycle described in the above-mentioned publication is used in a car air conditioner, in some cases, an intermediate portion of the intermediate heat exchanger with respect to the longitudinal direction thereof must be bent at least one location in order to reduce a required install space of the intermediate heat exchanger in the engine compartment of an automobile. However, at the bent portion, the outer tube deforms, and the high-temperature refrigerant flow path collapses, so that its cross sectional area decreases, which raises a problem of increased pressure loss.

In the case of the double-wall-tube heat exchanger described in the publication, the groove portions of the inner tube not only increase the heat transmission area between the refrigerants flowing through the two flow paths, but also prevent collapse of the high-temperature refrigerant flow path at the bent portion, which collapse would decrease the cross sectional area of the high-temperature refrigerant flow path.

However, since the groove portions of the inner tube of the double-wall-tube heat exchanger described in the publication are formed by means of performing additional work on a manufactured inner tube over a relatively wide area so as to deform the tube wall, the conventional double-wall-tube heat exchanger has a problem in that the additional work is troublesome.

SUMMARY OF THE INVENTION

An object of the present invention is to solve the above-mentioned problem and to provide a double-wall-tube heat exchanger which can prevent collapse of a refrigerant flow path between inner and outer tubes even when the heat exchanger has a bent portion, and which can simplify manufacturing work.

To achieve the above object, the present invention comprises the following modes.

1) A double-wall-tube heat exchanger comprising an outer tube, and an inner tube disposed in and spaced apart from the outer tube such that a clearance between the outer tube and the inner tube and the interior of the inner tube serve as respective refrigerant flow paths, wherein at least one end portion of the inner tube projects from the outer tube, and the, outer tube includes an expanded portion which is formed near an end portion of the outer tube from which the inner tube projects, and a contracted portion which is formed on the outer side of the expanded portion with respect to a longitudinal direction, is smaller in diameter than the expanded portion, and is brazed to the inner tube, wherein the outer tube includes a plurality of ridges integrally provided on an inner circumferential surface thereof at predetermined intervals in a circumferential direction such that the ridges project radially inward and extend along the longitudinal direction; portions of the ridges which portions are present on inner circumferential surfaces of the expanded portion and the contracted portion of the outer tube are crushed; and clearances between an outer circumferential surface of the inner tube and inner circumferential surfaces of portions of the contracted portion of the outer tube where the ridges are not formed are filled with a brazing filler metal.

2) A double-wall-tube heat exchanger according to par. 1), wherein a portion of the outer tube located inward of the expanded portion with respect to the longitudinal direction has an outer diameter of 19 mm or greater, and relations $0.25 \leq h/t \leq 0.625$ and $0.72 \leq n/D1 \leq 0.96$ are satisfied, where t represents a wall thickness of the outer tube, D1 represents an inner diameter of the outer tube, h represents a height of the ridges, and n represents a number of the ridges.

3) A double-wall-tube heat exchanger according to par. 1), where a relation $1.23 \leq D2/D3 \leq 1.45$ is satisfied wherein D2 represents an outer diameter of the expanded portion of the outer tube, and D3 represents an outer diameter of a portion of the outer tube located inward of the expanded portion with respect to the longitudinal direction.

4) A double-wall-tube heat exchanger according to par. 1), wherein a clearance between distal ends of the ridges of the outer tube and an outer circumferential surface of the inner tube is 0 to 0.5 mm.

5) A double-wall-tube heat exchanger according to par. 1), wherein a cross-sectional area of the refrigerant flow path between the outer tube and the inner tube is equal to or greater than the area of a circle having a radius of 4.0 mm.

6) A double-wall-tube heat exchanger according to par. 1), wherein the outer tube has a wall thickness of 0.8 to 1.2 mm, and the ridges have a height of 0.3 to 1.1 mm.

7) A double-wall-tube heat exchanger according to par. 1), wherein the outer tube includes a conical portion formed between the expanded portion and the contracted portion such that the conical portion decreases in diameter from the expanded portion side toward the contracted portion side, and the brazing filler metal remains between the outer circumferential surface of the inner tube and an end portion of an inner circumferential surface of the conical portion, the end portion being located on the side toward the contracted portion.

8) A double-wall-tube heat exchanger according to par. 1), wherein opposite end portions of the inner tube project from the outer tube; and the expanded portion is formed at each of positions near the opposite ends of the outer tube.

9) A method for manufacturing a double-wall-tube heat exchanger comprising an outer tube, and an inner tube disposed in and spaced apart from the outer tube such that a clearance between the outer tube and the inner tube and the interior of the inner tube serve as respective refrigerant flow paths, wherein at least one end portion of the inner tube projects from the outer tube, and the outer tube includes an expanded portion which is formed near an end portion of the outer tube from which the inner tube projects, and a contracted portion which is formed on the outer side of the expanded portion with respect to a longitudinal direction, is smaller in diameter than the expanded portion, and is brazed to the inner tube, the method comprising:

preparing an outer tube which includes a plurality of ridges integrally provided on an inner circumferential surface thereof at equal intervals in a circumferential direction such that the ridges project radially inward and extend along the longitudinal direction, and which has a constant outer diameter over the entire length thereof;

forming a cylindrical expanded portion of a predetermined length at at least one end portion of the outer tube by use of a punch, and crushing portions of the ridges which portions are present on an inner circumferential surface of the expanded portion by use of the punch;

forming a conical portion and a cylindrical contracted portion on the outer tube at positions located on the outer side of the expanded portion with respect to the longitudinal direction by use of a punch, the conical portion extending from an outer end portion of the expanded portion and tapered such that the conical portion gradually decreases in diameter toward the outer side, and the contracted portion extending from an outer end portion of the conical portion, being smaller in outer diameter than the expanded portion, and having a predetermined length;

preparing an inner tube having a constant outer diameter over the entire length thereof, and inserting the inner tube into the outer tube such that at least one end portion of the inner tube projects from an end portion of the outer tube at which the expanded portion is formed;

externally crimping a conical-portion-side end portion of the contracted portion of the outer tube by use of a crimping member to thereby fix the outer tube to the inner tube; and brazing the contracted portion of the outer tube and the inner tube over the entire circumferences thereof.

10) A method for manufacturing a double-wall-tube heat exchanger comprising an outer tube, and an inner tube disposed in and spaced apart from the outer tube such that a clearance between the outer tube and the inner tube and the interior of the inner tube serve as respective refrigerant flow paths, wherein at least one end portion of the inner tube projects from the outer tube, and the outer tube includes an expanded portion which is formed near an end portion of the outer tube from which the inner tube projects, and a contracted portion which is formed on the outer side of the expanded portion with respect to a longitudinal direction, is smaller in diameter than the expanded portion, and is brazed to the inner tube, the method comprising:

preparing an outer tube which includes a plurality of ridges integrally provided on an inner circumferential surface thereof at equal intervals in a circumferential direction such that the ridges project radially inward and extend along the longitudinal direction, and which has a constant outer diameter over the entire length thereof;

forming a cylindrical expanded portion of a predetermined length at at least one end portion of the outer tube by use of a punch, and crushing portions of the ridges which portions are present on an inner circumferential surface of the expanded portion by use of the punch;

forming a conical portion and a cylindrical contracted portion on the outer tube at positions located on the outer side of the expanded portion with respect to the longitudinal direction by use of a punch, the conical portion extending from an outer end portion of the expanded portion and tapered such that the conical portion gradually decreases in diameter toward the outer side, and the contracted portion extending from an outer end portion of the conical portion, being smaller in outer diameter than the expanded portion, and having a predetermined length;

forming a flare portion at an outer end portion of the contracted portion of the outer tube by use of a punch, the flare portion flaring radially outward toward the outer side;

preparing an inner tube having a constant outer diameter over the entire length thereof, and inserting the inner tube into the outer tube such that at least one end portion of the inner tube projects from an end portion of the outer tube at which the expanded portion is formed;

externally crimping the contracted portion of the outer tube, excluding the flare portion, by use of a crimping member to thereby fix the outer tube to the inner tube; and brazing the contracted portion of the outer tube and the inner tube over the entire circumferences thereof.

11) A method for manufacturing a double-wall-tube heat exchanger according to par. 9) or 10), wherein the brazing between the contracted portion of the outer tube and the inner tube is performed by torch brazing while the brazing filler metal is supplied onto the circumference of a contracted-portion-side end portion of the portion of the inner tube projecting from the outer tube.

12) A method for manufacturing a double-wall-tube heat exchanger according to par. 9) or 10), wherein the expanded portion, the conical portion, and the contracted portion are formed at each of opposite end portions of the outer tube; the inner tube is inserted into the outer tube such that opposite end portions of the inner tube project from the opposite end portions of the outer tube.

According to the double-wall-tube heat exchanger of par. 1), a plurality of ridges are integrally provided on the inner circumferential surface of the outer tube at intervals in the circumferential direction such that the ridges project radially inward and extend along the longitudinal direction. Therefore, even in the case where the double-wall-tube heat exchanger has a bent portion, by virtue of the action of the ridges of the outer tube, collapse of the refrigerant flow path between the inner tube and the outer tube during bending work can be prevented. In addition, when the outer tube is manufactured by means of, for example, extrusion, the ridges can be formed integrally with the outer tube. Therefore, manufacture of the double-wall-tube heat exchanger can be simplified. Furthermore, portions of the ridges which portions are present on the inner circumferential surfaces of the expanded portion and the contracted portion of the outer tube are crushed, and the clearances between the outer circumferential surface of the inner tube and the inner circumferential surfaces of portions of the contracted portion of the outer tube where the ridges are not formed are filled with a brazing filler metal. Therefore, leakage of refrigerant flowing through the refrigerant flow path between the outer tube and the inner tube can be prevented.

According to the double-wall-tube heat exchanger of par. 2), a portion of the outer tube located inward of the expanded portion with respect to the longitudinal direction has an outer diameter of 19 mm or greater, and the relations $0.25 \leq h/t \leq 0.625$ and $0.72 \leq n/D1 \leq 0.96$ are satisfied, where t represents the wall thickness of the outer tube, D1 represents the inner diameter of the outer tube, h represents the height of the ridges, and n represents the number of the ridges. Therefore, the following effects are attained. That is, the expanded portion and the contracted portion of the outer tube are formed through a process in which, after a cylindrical expanded portion of a predetermined length is formed at at least one end portion of the outer tube by use of a punch, and portions of the ridges which portions are present on the inner circumferential surface of the expanded portion are crushed by use of the punch, a conical portion and a cylindrical contracted portion are formed on the outer tube at positions located on the outer side of the expanded portion with respect to the longitudinal direction by use of a punch, wherein the conical portion extends from an outer end portion of the expanded portion and is tapered such that the conical portion gradually decreases in diameter toward the outer side, and the contracted portion extends from an outer end portion of the conical portion, is smaller in outer diameter than the expanded portion, and has a predetermined length. In the case where the relation $0.25 \leq h/t \leq 0.625$ (t: the wall thickness of the outer tube; h: the height of the ridges) is satisfied, collapse of the refrigerant flow path between the outer tube and the inner tube during bending work can be prevented effectively by the action of the ridges of the outer tube. In addition, when the outer tube is expanded by use of the punch, the ridges are crushed without fail. Therefore, the size of the clearances between the outer circumferential surface of the inner tube and the inner circumferential surfaces of portions of the contracted portion of the outer tube where the ridges are not formed can be set to such a size that the clearances can be filled with the brazing filler metal when the contracted portion of the outer tube and the inner tube are brazed together. Further, when the relation $0.72 \leq n/D1 \leq 0.96$ (D1: the inner diameter of the outer tube; n: the number of the ridges) is satisfied, collapse of the refrigerant flow path between the outer tube and the inner tube during bending work can be prevented effectively by the action of the ridges of the outer tube.

According to the double-wall-tube heat exchanger of par. 3), the relation $1.23 \leq D2/D3 \leq 1.45$ is satisfied wherein D2 represents the outer diameter of the expanded portion of the outer tube, and D3 represents the outer diameter of a portion of the outer tube located inward of the expanded portion with respect to the longitudinal direction. Therefore, the size of the clearance between the inner circumferential surface of the expanded portion of the outer tube and the outer circumferential surface of the inner tube can be set to such a size that the flow of refrigerant having flowed from a refrigerant inflow pipe into the interior of the expanded portion can be effectively spread over the entire circumference of the refrigerant flow path between the outer and inner tubes, and that the flows of refrigerant having flowed through the refrigerant flow path between the outer and inner tubes can be effectively merged before flowing out through a refrigerant outflow pipe.

According to the double-wall-tube heat exchanger of par. 4), generation of a wrinkle on the outer tube, which would otherwise be generated when the double-wall-tube heat exchanger is bent, can be prevented without fail.

According to the double-wall-tube heat exchanger of par. 5), an increase in the flow resistance of the refrigerant flow path between the outer tube and the inner tube can be suppressed.

According to the double-wall-tube heat exchanger of par. 6), the wall thickness of the outer tube is 0.8 to 1.2 mm. Therefore, it is possible to prevent a drop in workability at the time of formation of the expanded portion and the contracted portion, while securing the satisfactory withstanding pressure of the outer tube. Furthermore, since the height of the ridges is 0.3 to 1.1 mm, the ridges are crushed without fail when the outer tube is expanded by use of the punch. Therefore, the size of the clearances between the outer circumferential surface of the inner tube and the inner circumferential surfaces of portions of the contracted portion of the outer tube where the ridges are not formed can be set to such a size that the clearances can be filled with the brazing filler metal when the contracted portion of the outer tube and the inner tube are brazed together. In addition, by virtue of the action of the ridges of the outer tube, collapse of the refrigerant flow path between the inner tube and the outer tube during bending work can be prevented effectively.

According to the double-wall-tube heat exchanger of par. 7), since the amount of the brazing filler metal which contributes to the brazing between the contracted portion of the outer tube and the inner tube increases, the strength of brazing between the contracted portion of the outer tube and the inner tube increases.

According to the method for manufacturing a double-wall-tube heat exchanger of par. 9), since the amount of the brazing filler metal which contributes to the brazing between the contracted portion of the outer tube and the inner tube increases, the strength of brazing between the contracted portion of the outer tube and the inner tube increases.

According to the method for manufacturing a double-wall-tube heat exchanger of par. 10), since the amount of the brazing filler metal which contributes to the brazing between the contracted portion of the outer tube and the inner tube increases, the strength of brazing between the contracted portion of the outer tube and the inner tube increases.

DESCRIPTION OF THE PREFERRED EMBODIMENT

An embodiment of the present invention will next be described in detail with reference to the drawings.

In the following description, the term "aluminum" encompasses aluminum alloys in addition to pure aluminum.

Figure 1:
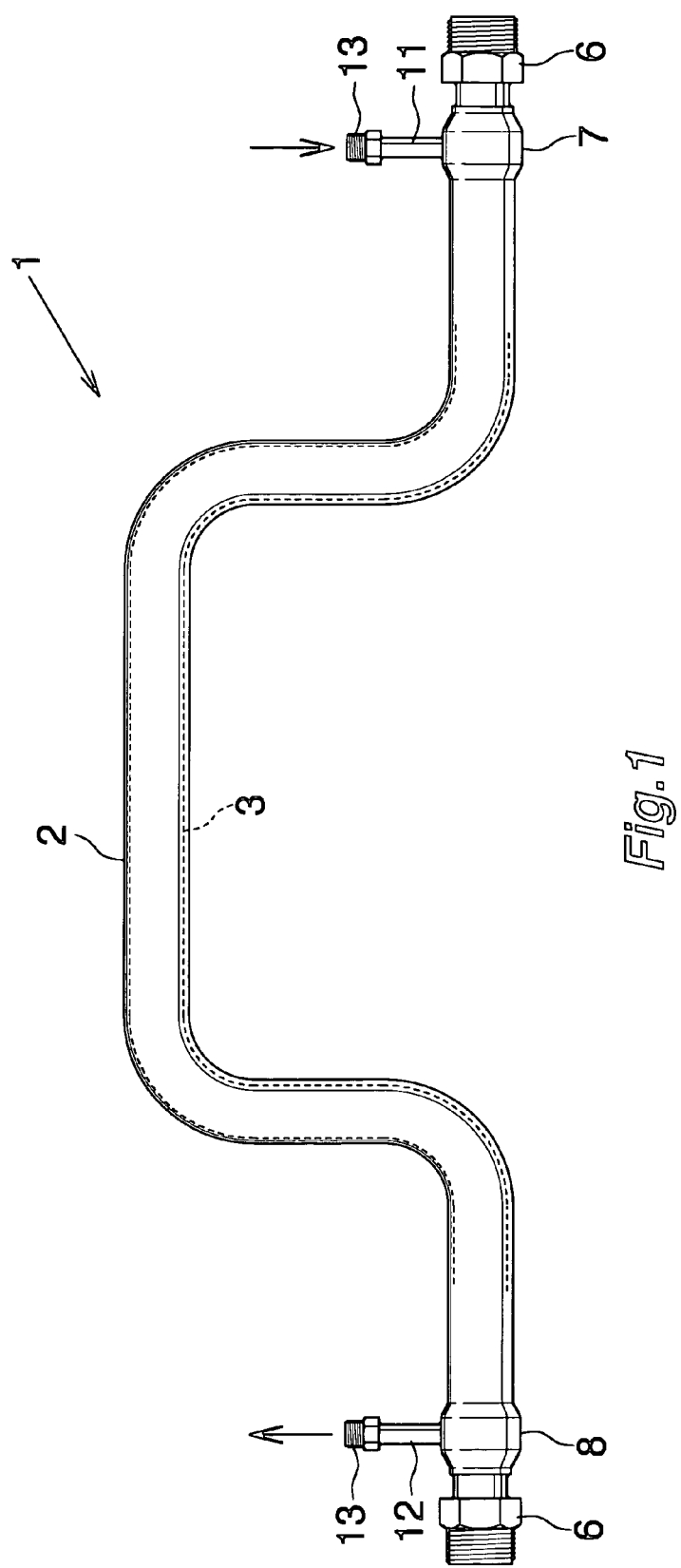
FIG. 1 is a front view showing the overall structure of a double-wall-tube heat exchanger according to the present invention.
Figure 2:
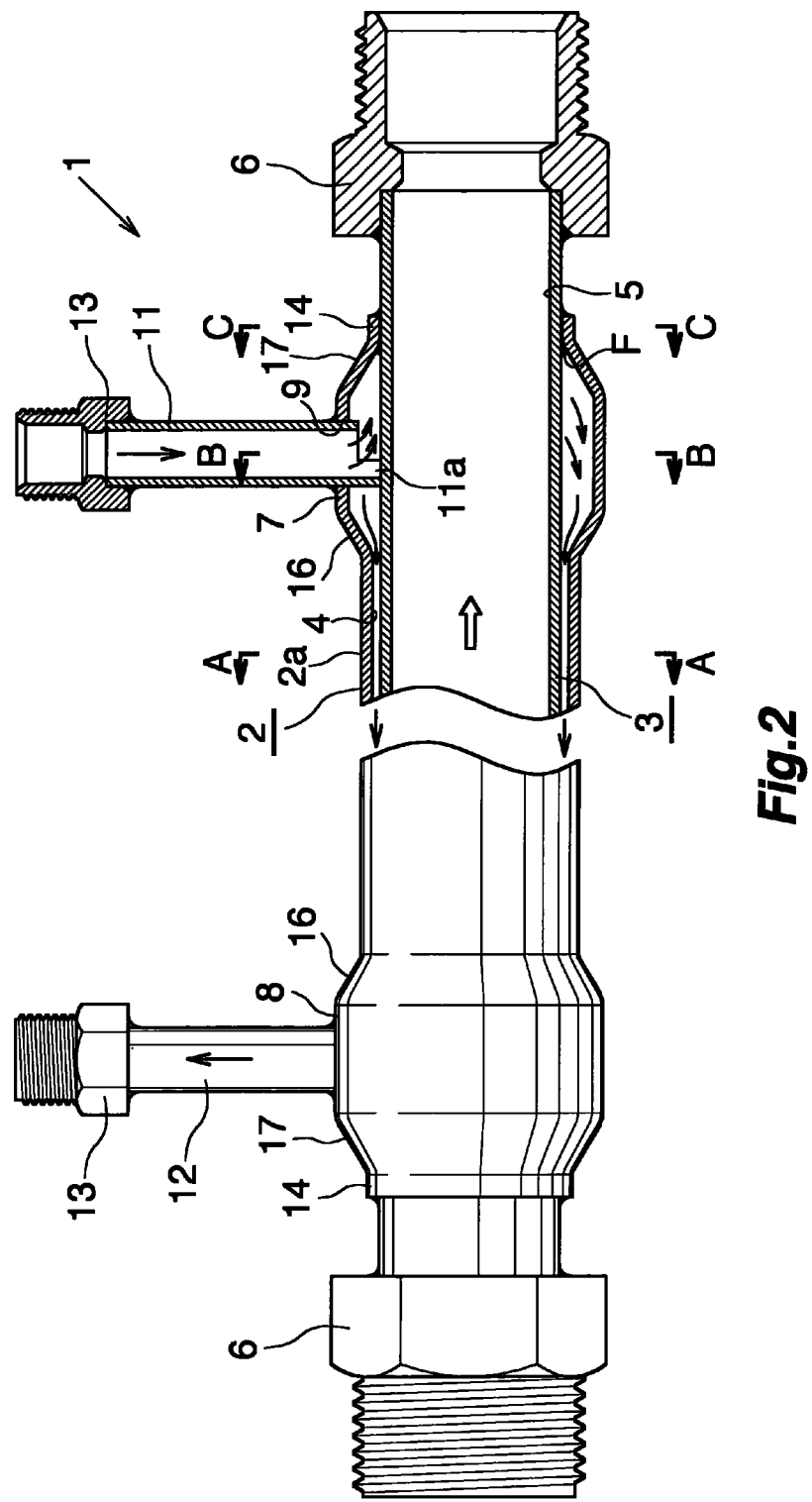
FIG. 2 is a partially cutaway front view of the double-wall-tube heat exchanger of FIG. 1 with a longitudinally intermediate portion omitted.
Figure 3:
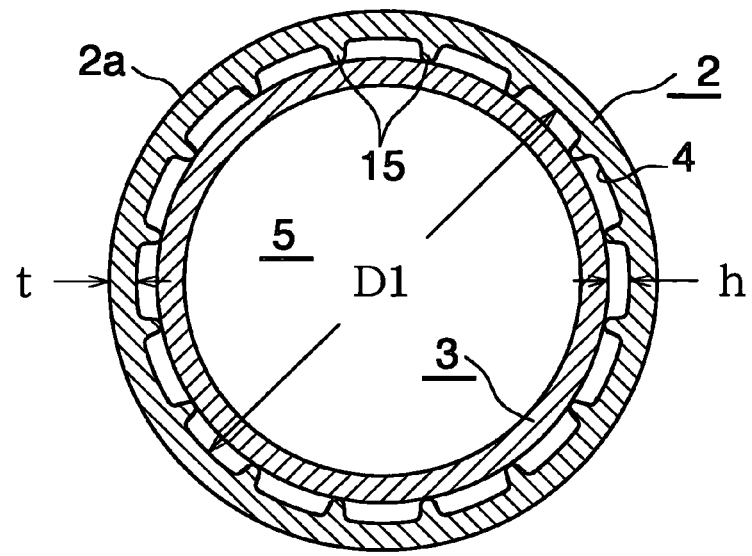
FIG. 3 is an enlarged sectional view taken along line A-A of FIG. 2.
Figure 4:
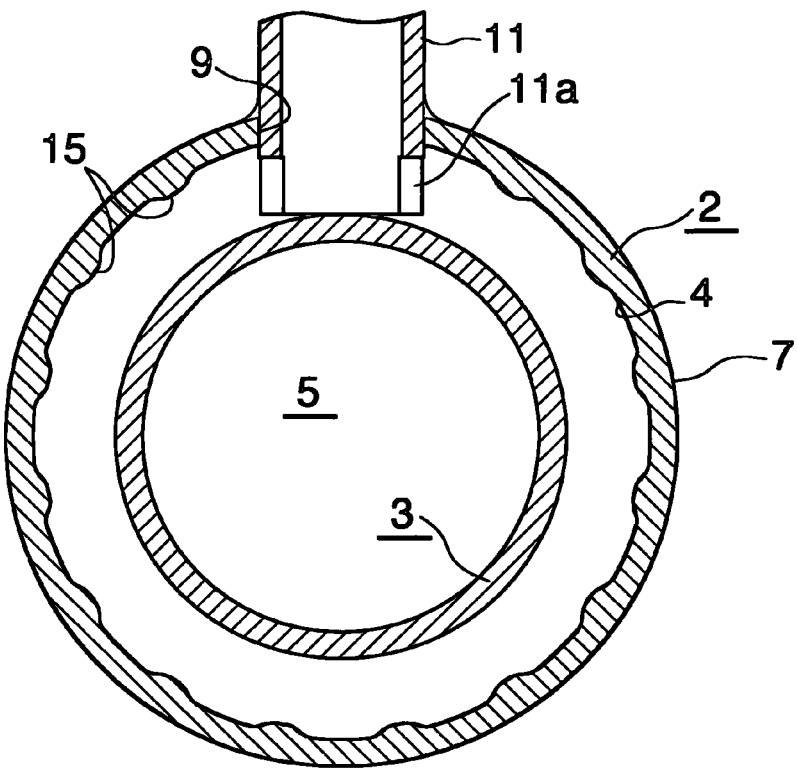
FIG. 4 is an enlarged sectional view taken along line B-B of FIG. 2.
Figure 5:
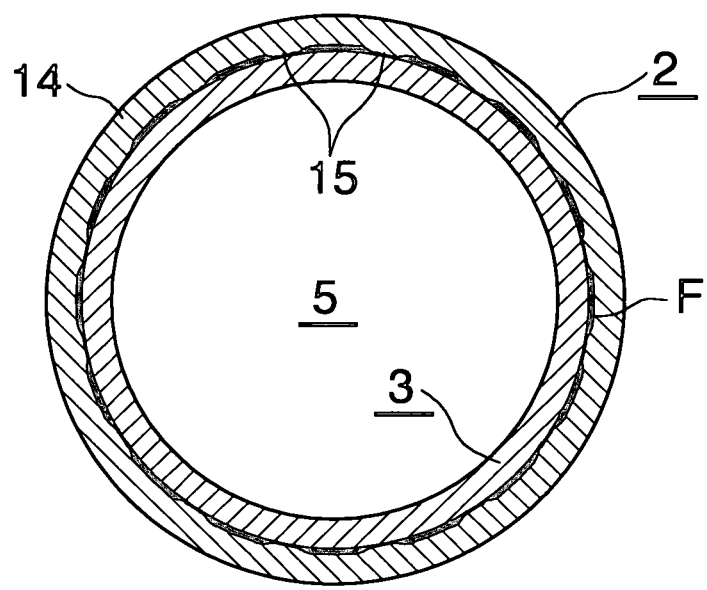
FIG. 5 is an enlarged sectional view taken along line C-C of FIG. 2.
Figure 6:
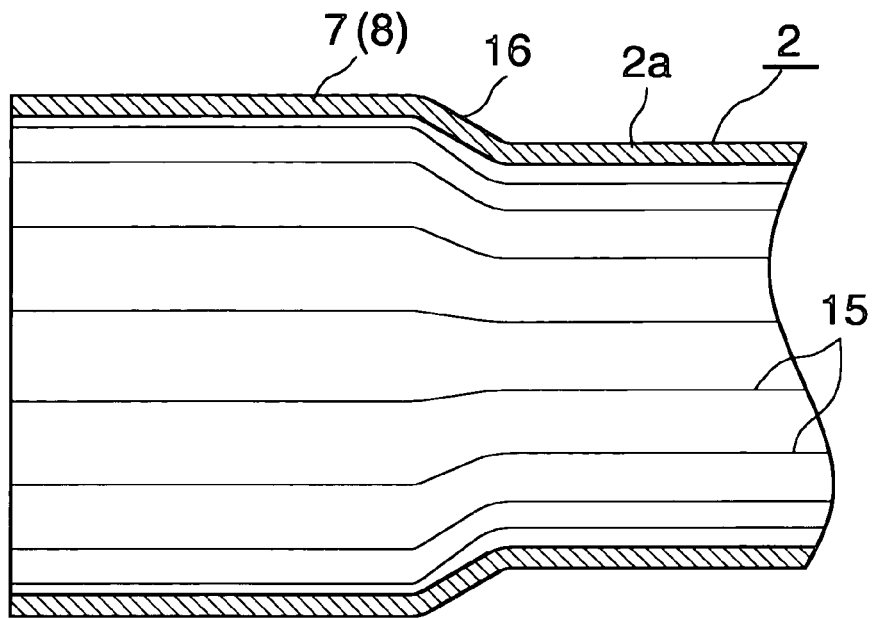
FIG. 6 is a partial enlarged sectional view showing a portion of the steps of a method for manufacturing the double-wall-tube heat exchanger of FIG. 1.
Figure 7:
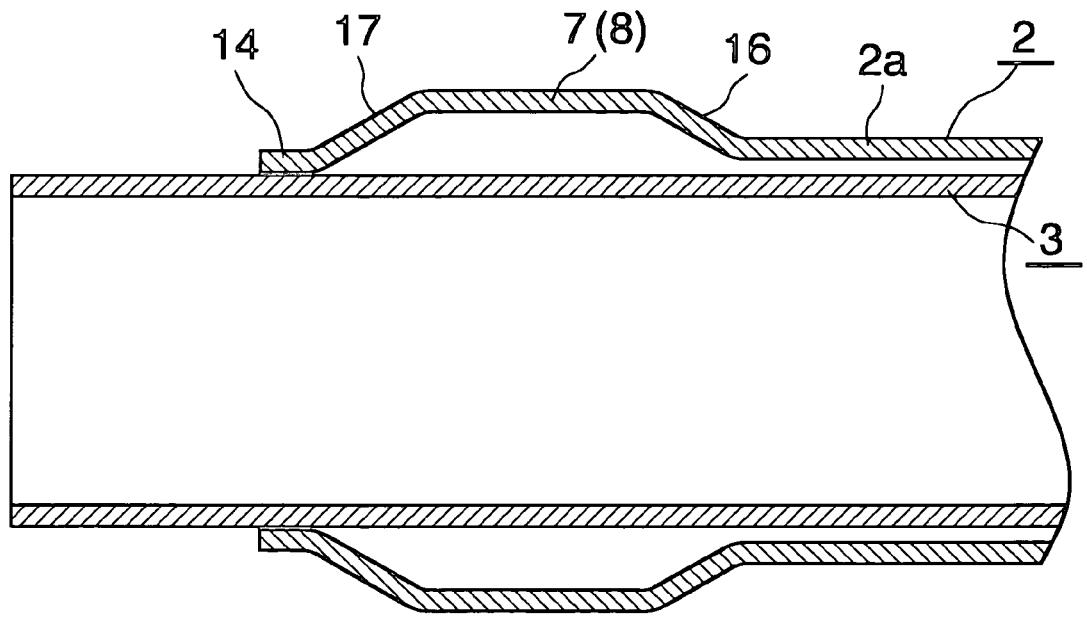
FIG. 7 is a partial enlarged sectional view showing a portion of the steps of the method for manufacturing the double-wall-tube heat exchanger of FIG. 1, the portion being different from that shown in FIG. 6.
Figure 8:
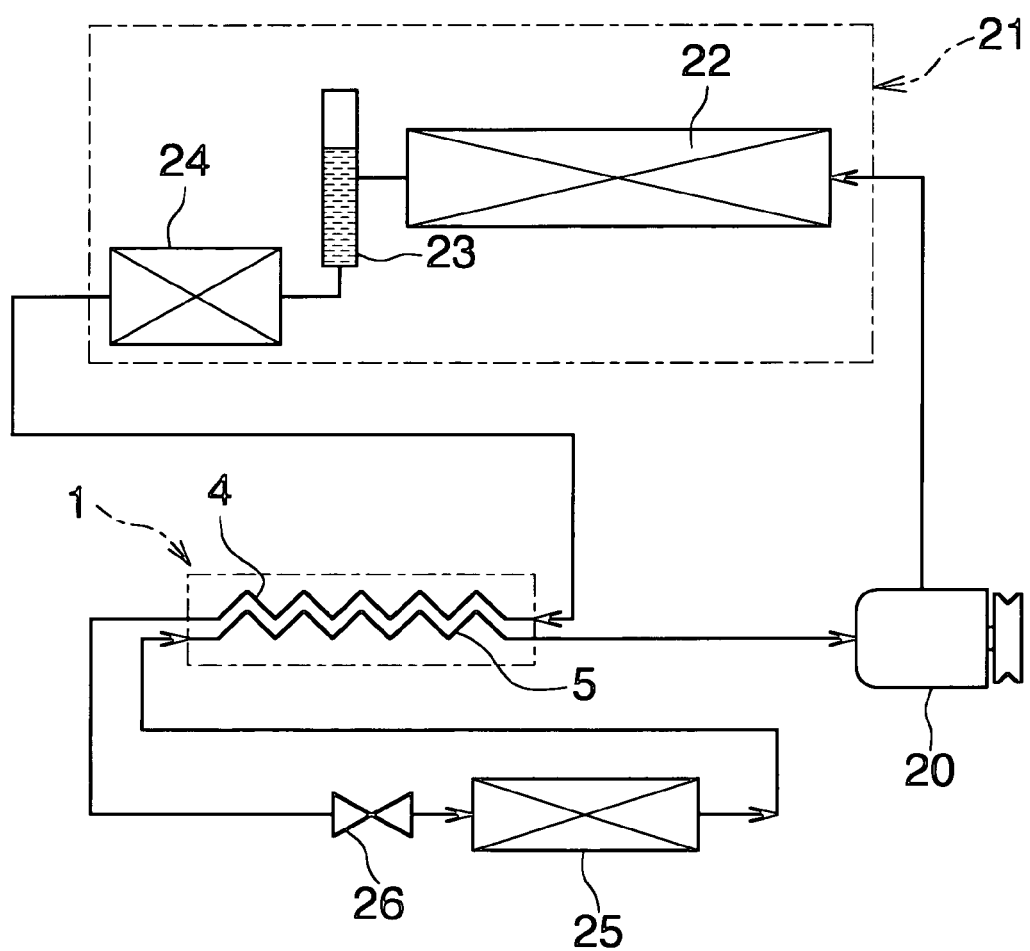
FIG. 8 is a diagram showing a refrigeration cycle which uses the double-wall-tube heat exchanger of FIG. 1 as an intermediate heat exchanger.

FIGS. 1 and 2 show the overall structure of a double-wall-tube heat exchanger according to the present invention; FIGS. 3 to 5 show the structure of its main portion; and FIGS. 6 and 7 show a portion of the steps of manufacturing the double-wall-tube heat exchanger of FIG. 1. FIG. 8 shows a refrigeration cycle in which the double-wall-tube heat exchanger of FIG. 1 is used as an intermediate heat exchanger.

In FIGS. 1 and 2, a double-wall-tube heat exchanger 1 includes an outer tube 2 and an inner tube 3. The outer tube 2 is formed of an aluminum extrudate having a circular transverse cross section. The inner tube 3 is formed of an aluminum extrudate having a circular transverse cross section and is inserted concentrically into and spaced apart from the outer tube 2. The double-wall-tube heat exchanger 1 is bent at a plurality of locations. A clearance between the outer tube 2 and the inner tube 3 of the double-wall-tube heat exchanger 1 serves as a first refrigerant flow path 4. The interior of the inner tube 3 serves as a second refrigerant flow path 5. Opposite end portions of the inner tube 3 project from opposite end portions of the outer tube 2, and pipe-coupling members 6 are joined to the projecting end portions of the inner tube 3.

The outer tube 2 includes expanded portions 7 and 8 formed near the opposite ends thereof; i.e., at locations slightly offset inward from the opposite ends with respect to the longitudinal direction. The outer tube 2 includes conical portions 16 formed between the expanded portions 7 and 8 and a portion 2a located inward of the expanded portions 7 and 8 with respect to the longitudinal direction; i.e., extending between the expanded portions 7 and 8. The conical portions 16 are tapered such that their diameters gradually decrease from the expanded portions 7 and 8 toward the inner side with respect to the longitudinal direction. A refrigerant inlet 9 is formed in the wall of one expanded portion 7 of the outer tube 2, and a refrigerant outlet (not shown) is formed in the wall of the other expanded portion 8.

One end of a high-pressure-refrigerant inflow pipe 11, which is formed of aluminum and which is to communicate with the first refrigerant flow path 4, is inserted into the refrigerant inlet 9, and is brazed to the expanded portion 7. The high-pressure-refrigerant inflow pipe 11 has, at the one end, a projection 11a, which partially extends in the circumferential direction of the pipe. The projection 11a comes into contact with the outer circumferential surface of the inner tube 3 so as to determine the insertion depth of the high-pressure-refrigerant inflow pipe 11. Furthermore, one end of a high-pressure-refrigerant outflow pipe 12, which is formed of aluminum and which is to communicate with the first refrigerant flow path 4, is inserted into the refrigerant outlet, and is brazed to the expanded portion 8. Although not illustrated, the high-pressure-refrigerant outflow pipe 12 also has, at the one end, a projection, which partially extends in the circumferential direction of the pipe. The projection comes into contact with the outer circumferential surface of the inner tube 3 so as to determine the insertion depth of the high-pressure-refrigerant outflow pipe 12. Pipe-coupling members 13 are joined to the other ends (outer ends) of the high-pressure-refrigerant inflow pipe 11 and the high-pressure-refrigerant outflow pipe 12.

The outer tube 2 further includes cylindrical contracted portions 14, which are smaller in diameter than the expanded portions 7 and 8 and which are formed on the outer sides of the expanded portions 7 and 8 with respect to the longitudinal direction. The contracted portions 14 are brazed to the inner tube 3. The outer tube 2 includes conical portions 17 formed between the contracted portions 14 and the expanded portions 7 and 8. The conical portions 17 are tapered such that their diameters gradually decrease from the expanded portions 7 and 8 toward the contracted portions 14. A brazing filler metal F remains between the outer circumferential surface of the inner tube 3 and an end portion of the inner circumferential surface of each conical portion 17, the end portion being located on the side toward the contracted portion 14.

As shown in FIGS. 3 to 5, a plurality of ridges 15 are integrally provided on the inner circumferential surface of the outer tube 2 at equal intervals in the circumferential direction. The ridges 15, which project radially inward, extend along the longitudinal direction of the outer tube 2. The ridges 15 are crushed on the inner circumferential surfaces of the expanded portions 7 and 8, the contracted portions 14, and the conical portions 16 and 17 of the outer tube 2. The brazing filler metal F fills the clearances between the outer circumferential surface of the inner tube 3 and the inner circumferential surfaces of portions of each contracted portion 14 of the outer tube 2 where the ridges 15 are not formed.

In the case where the portion 2a of the outer tube 2 extending between the expanded portions 7 and 8 has an outer diameter of 19 mm or greater, preferably, the relations $0.25 \leq h/t \leq 0.625$ and $0.72 \leq n/D1 \leq 0.96$ are satisfied, where t represents the wall thickness of the outer tube 2, D1 represents the inner diameter of the outer tube 2 as measured at portions where the ridges 15 are not formed, h represents the height of the ridges, and n represents the number of the ridges. When the value of h/t is excessively small, in some case, collapse of the first refrigerant flow path 4 between the outer tube 2 and the inner tube 3 cannot be reliably prevented when the double-wall-tube heat exchanger 1 is bent. When the value of h/t is excessively large, the following problems may occur in some cases. When the expanded portions 7 and 8 of the outer tube 2 are mechanically formed through use of a jig, the ridges 15 cannot be crushed sufficiently. Therefore, the size of the clearances between the outer circumferential surface of the inner tube 3 and the inner circumferential surfaces of the portions of each contracted portion 14 of the outer tube 2 where the ridges 15 are not formed cannot be set to such a size that the clearances are filled with the brazing filler metal without fail. For example, in the case where the outer diameter of the outer tube 2 is 19 mm or greater, preferably, the wall thickness t of the outer tube 2 is 0.8 to 1.2 mm, and the height h of the ridges 15 is 0.3 to 1.1 mm. In addition, preferably, the cross-sectional area of the first refrigerant flow path 4 between the outer tube 2 and the inner tube 3 is equal to or greater than the area of a circle having a radius of 4.0 mm.

Further, preferably, the relation $1.23 \leq D2/D3 \leq 1.45$ is satisfied where D2 represent the outer diameter of the expanded portions 7 and 8 of the outer tube 2, and D3 represents the outer diameter of the portion 2a of the outer tube 2 extending between the expanded portions 7 and 8. When the value of D2/D3 falls outside the above-described range, the size of the clearances between the outer circumferential surface of the inner tube 3 and the inner circumferential surfaces of the expanded portions 7 and 8 of the outer tube 2 cannot be set to such a size that refrigerant having flowed from the high-pressure-refrigerant inflow pipe 11 into the interior of the expanded portion 7 is effectively spread or divided over the entire circumference of the path, and that the flows of refrigerant having flowed through channels between the adjacent ridges 15 within the first refrigerant flow path 4 are effectively merged before flowing out through the high-pressure-refrigerant outflow pipe 12. Furthermore, the clearance between the outer circumferential surface of the inner tube 3 and the distal ends of the ridges 15 of the portion of the outer tube 2 extending between the expanded portions 7 and 8 is 0 to 0.5 mm. When this clearance is excessively large, a wrinkle becomes more likely to be produced on the outer tube 2 as a result of bending of the double-wall-tube heat exchanger 1.

As shown in FIGS. 6 and 7, the double-wall-tube heat exchanger 1 is manufactured by the following method.

First, there is prepared the outer tube 2, which includes the plurality of ridges 15 integrally provided on the inner circumferential surface of the outer tube 2 at equal intervals in the circumferential direction such that the ridges 15 project radially inward and extend along the longitudinal direction, and which has a constant outer diameter over the entire length thereof. By use of a punch, opposite end portions of the outer tube 2 are mechanically expanded over a predetermined length, whereby the conical portions 16 and the expanded portions 7 and 8 are formed (see FIG. 6). At that time, portions of the ridges 15 located at the conical portions 16 and the expanded portions 7 and 8 of the outer tube 2 are crushed by the punch.

Subsequently, the inner tube 3 is inserted into the outer tube 2 such that the opposite end portions of the inner tube 3 project from the opposite end portions of the outer tube 2. After that, roller working for pressing the outer tube 2 radially inward from the radially outer side is performed over the entire circumference of the outer tube 2, whereby the conical portions 17 and the cylindrical contracted portions 14 are formed on the outer tube 2 to be located on the outer sides of the expanded portions 7 and 8 with respect to the longitudinal direction (see FIG. 7). The conical portions 17 are formed such that they extend from the outer ends of the expanded portions 7 and 8 and gradually decrease in diameter toward the outer side. The cylindrical contracted portions 14 are formed such that they extend from the outer ends of the conical portions 17, are smaller in outer diameter than the expanded portions 7 and 8, and have a predetermined length. When the conical portions 17 and the contracted portions 14 are formed, portions of the ridges 15 located at the contracted portions 14 are crushed.

Subsequently, the contracted portions 14 of the outer tube 2 and the inner tube 3 are brazed together. Notably, in the case where brazing is performed between the pipe-coupling members 6 and the inner tube 3 and between the pipe-coupling members 13 and the high-pressure-refrigerant inflow pipe 11 and the high-pressure-refrigerant outflow pipe 12, such brazing is performed simultaneously with brazing between the contracted portions 14 of the outer tube 2 and the inner tube 3. Finally, the outer tube 2 and the inner tube 3 are bent at predetermined locations. Thus, the double-wall-tube heat exchanger 1 is completed.

FIG. 8 shows a refrigeration cycle in which the above-described double-wall-tube heat exchanger 1 is used as an intermediate heat exchanger.

The refrigeration cycle in FIG. 8 uses, for example, a chlorofluorocarbon-based refrigerant. The refrigeration cycle includes a compressor 20; a condenser 21 having a condensing section 22, a liquid receiver 23 serving as a vapor-liquid separator, and a supercooling section 24; an evaporator 25; an expansion valve 26 serving as a pressure-reducing device; and the double-wall-tube heat exchanger 1 which serves as an intermediate heat exchanger for performing heat exchange between refrigerant from the condenser 20 and refrigerant from the evaporator 25. Piping extending from the supercooling section 24 of the condenser 20 is connected to the high-pressure-refrigerant inflow pipe 11 connected to the outer tube 2 of the double-wall-tube heat exchanger 1. Similarly, piping extending to the expansion valve 26 is connected to the high-pressure-refrigerant outflow pipe 12 connected to the outer tube 2. Also, piping extending from the evaporator 25 is connected to one end portion of the inner tube 3 of the double-wall-tube heat exchanger 1 located on the side toward the high-pressure-refrigerant outflow pipe 12. Similarly, piping extending to the compressor 20 is connected to the other end portion of the inner tube 3 located on the side toward the high-pressure-refrigerant inflow pipe 11. The refrigeration cycle is mounted in a vehicle; for example, an automobile, as a car air conditioner.

In operation of the refrigeration cycle, a high-temperature, high-pressure vapor-liquid mixed-phase refrigerant, which has undergone compression in the compressor 20, is cooled and condensed in the condensing section 22 of the condenser 21. Subsequently, the refrigerant flows into the liquid receiver 23 and is separated into two phases; namely, the vapor phase and the liquid phase. The resultant liquid-phase refrigerant flows into the supercooling section 24 and is supercooled. The supercooled liquid-phase refrigerant flows into the expanded portion 7 of the outer tube 2 of the double-wall-tube heat exchanger 1 via the high-pressure-refrigerant inflow pipe 11, and enters the first refrigerant flow path 4 via the expanded portion 7. By the action of the expanded portion 7, the liquid-phase refrigerant having flowed into the expanded portion 7 is caused to dividedly flow into all the channels formed between the adjacent ridges 15 in the first refrigerant flow path 4. Meanwhile, the vapor-phase refrigerant from the evaporator 25 flows into the second refrigerant flow path 5 of the double-wall-tube heat exchanger 1. While flowing through the first refrigerant flow path 4, the liquid-phase refrigerant is further cooled by the vapor-phase refrigerant whose temperature is relatively low and which flows through the second refrigerant flow path 5. Having passed through all the channels formed between the adjacent ridges 15 in the first refrigerant flow path 4 of the double-wall-tube heat exchanger 1, the flows of the liquid-phase refrigerant merge together in the expanded portion 8. The liquid-phase refrigerant then flows to the expansion valve 26 through the high-pressure-refrigerant outflow pipe 12. In the expansion valve 26, the liquid-phase refrigerant is adiabatically expanded and is thereby pressure-reduced. Subsequently, the liquid-phase refrigerant flows into the evaporator 25 and is evaporated in the evaporator 25. Meanwhile, the vapor-phase refrigerant having passed through the second refrigerant flow path 5 of the double-wall-tube heat exchanger 1 is fed to the compressor 20.

Figure 9A:
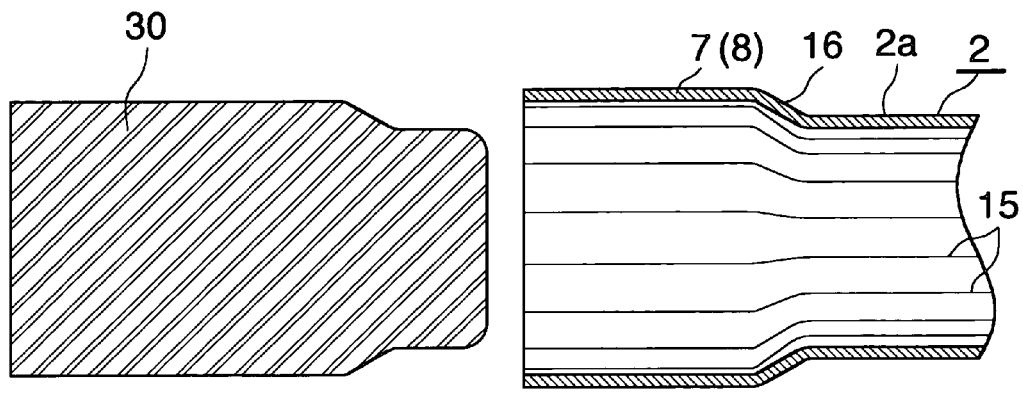
FIGS. 9a to 9c are partial enlarged sectional views showing a portion of the steps of another method for manufacturing the double-wall-tube heat exchanger of FIG. 1.
Figure 9B:
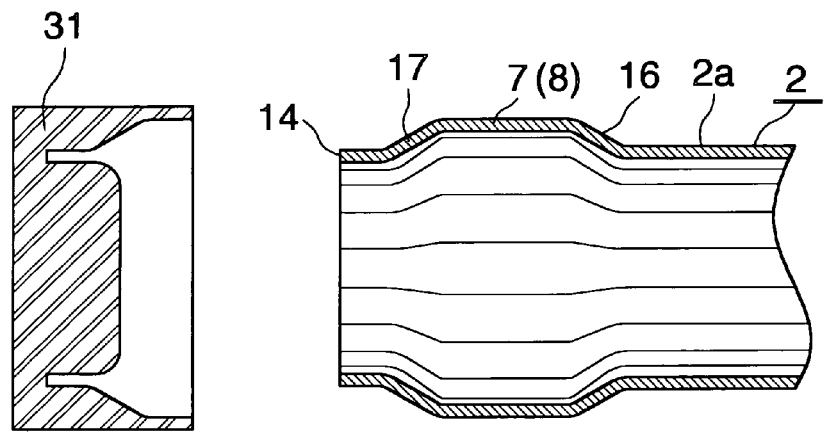
Figure 9C:
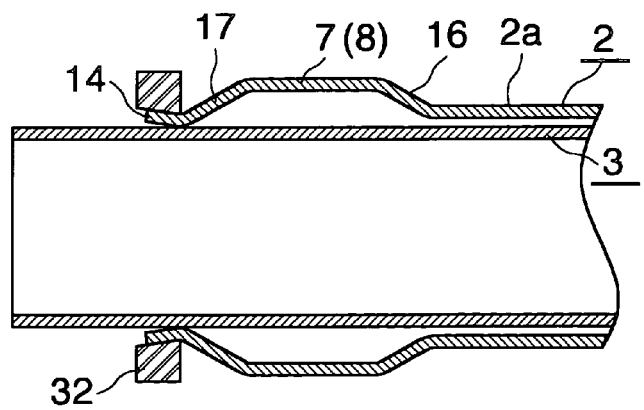

FIGS. 9a to 9c show another method for manufacturing the double-wall-tube heat exchanger 1.

First, there is prepared the outer tube 2, which includes the plurality of ridges 15 integrally provided on the inner circumferential surface of the outer tube 2 at equal intervals in the circumferential direction such that the ridges 15 project radially inward and extend along the longitudinal direction, and which has a constant outer diameter over the entire length thereof. By use of a first punch 30, opposite end portions of the outer tube 2 are mechanically expanded, whereby the conical portions 16 and the expanded portions 7 and 8 having a predetermined length are formed at the opposite ends of the outer tube 2. At that time, portions of the ridges 15 formed on the inner circumferential surfaces of the conical portions 16 and the expanded portions 7 and 8 are crushed by the first punch 30 (see FIG. 9a).

Subsequently, by use of a second punch 31, the conical portions 17 and the cylindrical contracted portions 14 are formed on the outer tube 2 at positions located on the outer sides of the expanded portions 7 and 8 with respect to the longitudinal direction (see FIG. 9b). The conical portions 17 are formed such that they extend from the outer ends of the expanded portions 7 and 8 and gradually decrease in diameter toward the outer side. The cylindrical contracted portions 14 are formed such that they extend from the outer ends of the conical portions 17, are smaller in outer diameter than the expanded portions 7 and 8, and have a predetermined length. The inner and outer diameters of the cylindrical contracted portions 14 are approximately equal to those of the portion 2a of the outer tube 2 extending between the expanded portions 7 and 8.

Subsequently, the inner tube 3 having a constant outer diameter over the entire length thereof is prepared, and is inserted into the outer tube 2 such that the opposite end portions of the inner tube 3 project from the opposite end portions of the outer tube 2.

Subsequently, end portions of the contracted portions 14 of the outer tube 2 located on the side toward the conical portions 17 are crimped from the outer side by use of a crimping member 32, whereby the outer tube 2 is fixed to the inner tube 3 (see FIG. 9c). The crimping member 32 is composed of a plurality of segments arranged to form a ringlike shape, and has an inner circumferential surface tapered such that the diameter decreases gradually toward the expanded portion 7 (8).

Subsequently, the inner circumferential surfaces of the contracted portions 14 of the outer tube 2 and the outer circumferential surface of the inner tube 3 are brazed together over the entire circumferences thereof. Preferably, this brazing is performed by means of torch brazing, while a brazing filler metal is supplied onto the circumferences of the end portions of the portions of the inner tube 3 projecting from the outer tube 2, the end portions being located on the side toward the contracted portions 14. During this brazing, the melted brazing filler metal enters the space between the outer tube 2 and the inner tube 3 via the clearances between the outer circumferential surface of the inner tube 3 and the inner circumferential surfaces of portions of each contracted portion 14 of the outer tube 2 where the ridges 15 are not formed. Thus, the clearances are filled with the brazing filler metal F, and the brazing filler metal F remains between the outer circumferential surface of the inner tube 3 and an end portion of the inner circumferential surface of each conical portion 17, the end portion being located on the side toward the contracted portion 14.

Finally, the outer tube 2 and the inner tube 3 are bent at predetermined locations, and the high-pressure-refrigerant inflow pipe 11 and the high-pressure-refrigerant outflow pipe 12 are brazed to the outer tube 2. Thus, the double-wall-tube heat exchanger 1 is completed.

Figure 10A:
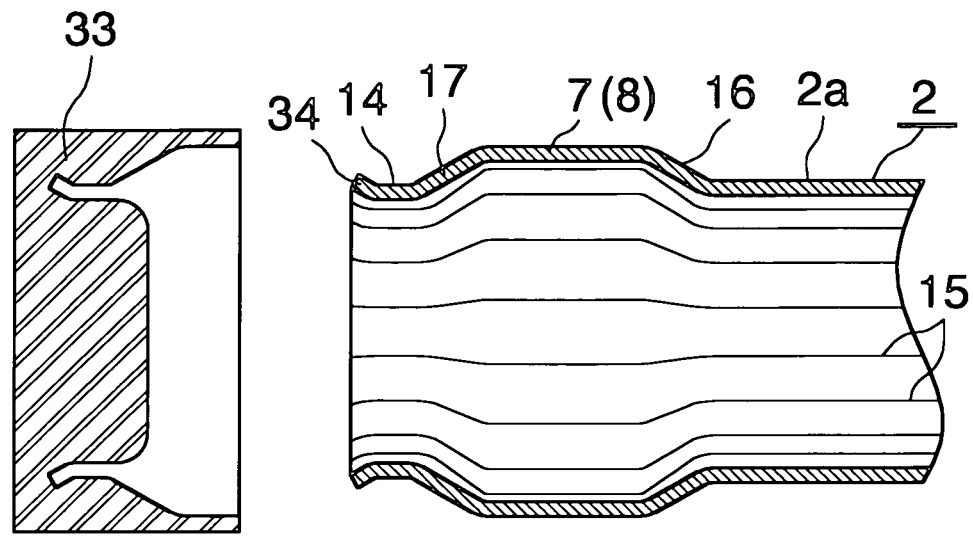
FIGS. 10a and 10b are partial enlarged sectional views showing a portion of the steps of still another method for manufacturing the double-wall-tube heat exchanger of FIG. 1.
Figure 10B:
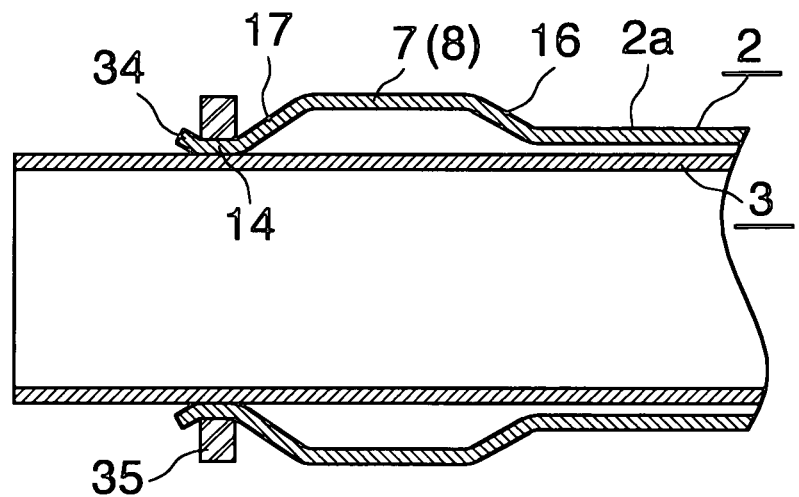

FIGS. 10a and 10b show still another method for manufacturing the double-wall-tube heat exchanger 1.

The method shown in FIGS. 10a and 10b is identical with the method shown in FIGS. 9a to 9c up to a point at which the contracted portions 14 are formed on the outer tube 2.

After formation of the contracted portions 14, by use of a third punch 33, a flare portion 34 is formed at an outer end of each contracted portion 14 of the outer tube 2 such that the flare portion 34 flares radially outward toward the outer side (see FIG. 10a). The third punch 33 is a segmented die.

Subsequently, the inner tube 3 having a constant outer diameter over the entire length thereof is prepared, and is inserted into the outer tube 2 such that the opposite end portions of the inner tube 3 project from the opposite end portions of the outer tube 2.

Subsequently, the contracted portions 14 of the outer tube 2, excluding the flare portions 34, are crimped from the outer side by use of a crimping member 35, whereby the outer tube 2 is fixed to the inner tube 3 (see FIG. 10b). The crimping member 35 is composed of a plurality of segments arranged to form a ringlike shape, and has a cylindrical inner circumferential surface.

Subsequently, the inner circumferential surfaces of the contracted portions 14 of the outer tube 2 and the outer circumferential surface of the inner tube 3 are brazed together over the entire circumferences thereof. Preferably, this brazing is performed by means of torch brazing, while a brazing filler metal is supplied onto the circumferences of the end portions of the portions of the inner tube 3 projecting from the outer tube 2, the end portions being located on the side toward the contracted portions 14. During this brazing, the melted brazing filler metal enters the space between the outer tube 2 and the inner tube 3 via the clearances between the outer circumferential surface of the inner tube 3 and the inner circumferential surfaces of portions of each contracted portion 14 of the outer tube 2 where the ridges 15 are not formed. Thus, the clearances are filled with the brazing filler metal F, and the brazing filler metal F remains between the outer circumferential surface of the inner tube 3 and an end portion of the inner circumferential surface of each conical portion 17, the end portion being located on the side toward the contracted portion 14.

Finally, the outer tube 2 and the inner tube 3 are bent at predetermined locations, and the high-pressure-refrigerant inflow pipe 11 and the high-pressure-refrigerant outflow pipe 12 are brazed to the outer tube 2. Thus, the double-wall-tube heat exchanger 1 is completed.

Figure 11:
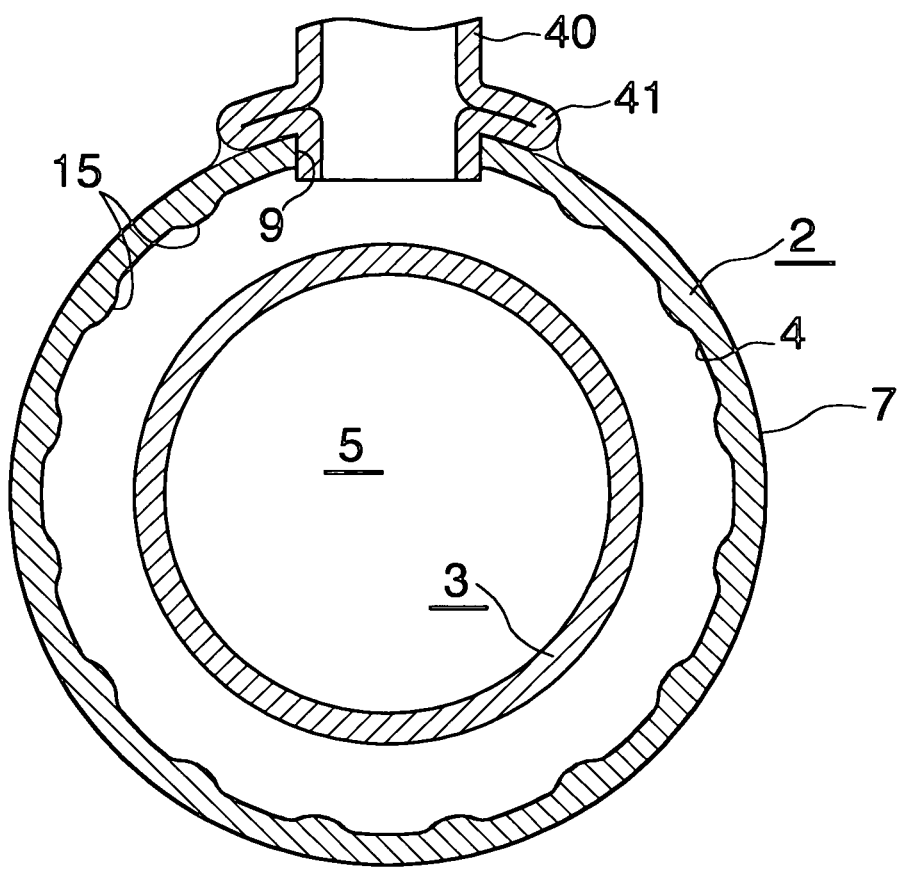
FIG. 11 is a view corresponding to FIG. 4 and showing a modification of a high-pressure-refrigerant inflow pipe.
Figure 12:
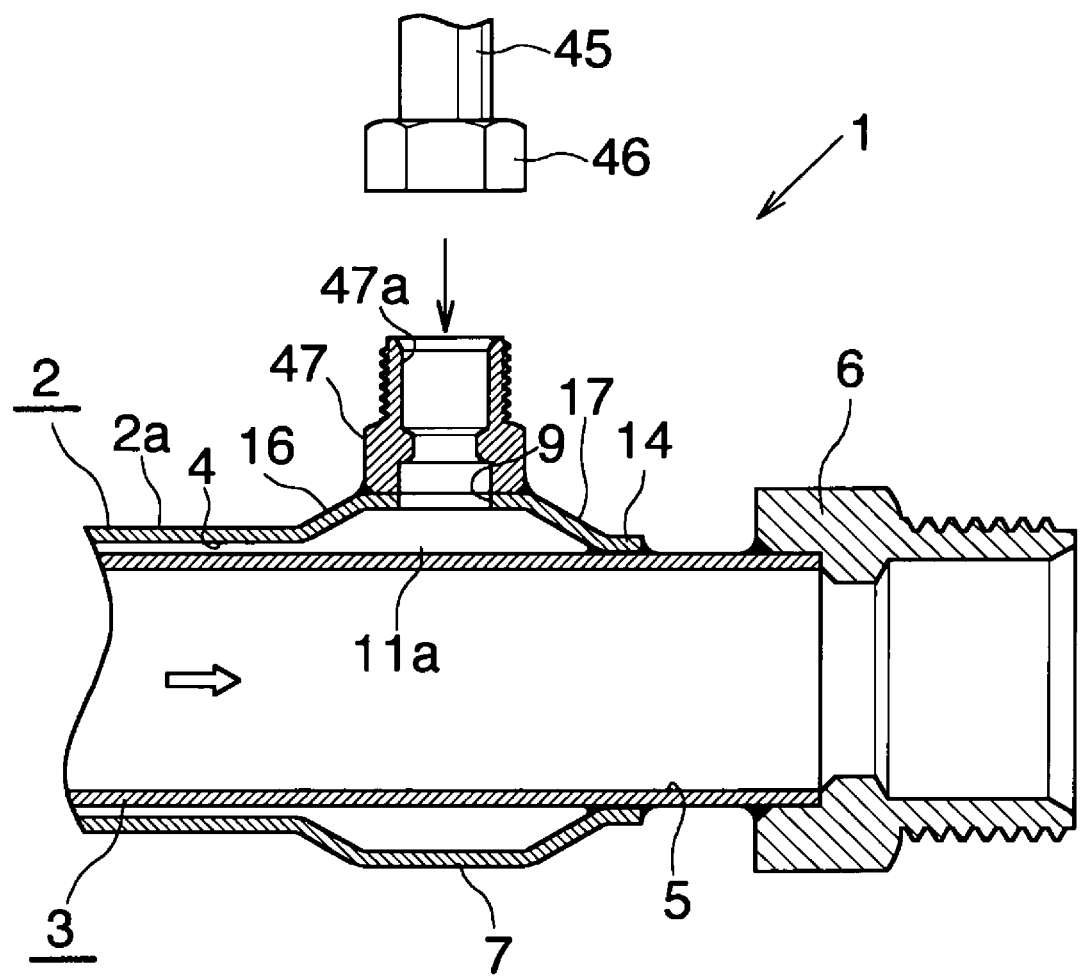
FIG. 12 is a view corresponding to a portion of FIG. 2 and showing another modification of the high-pressure-refrigerant inflow pipe.

FIGS. 11 and 12 show modifications of the high-pressure-refrigerant inflow pipe.

A high-pressure-refrigerant inflow pipe 40 shown in FIG. 11 does not have a projection for determining the insertion depth of the high-pressure-refrigerant inflow pipe 40. The high-pressure-refrigerant inflow pipe 40 includes an outward projecting bead 41 at a position near the end thereof which is connected to the outer tube 2. The outward projecting bead 41 has an outer diameter greater than the diameters of the refrigerant inlet 9 and the refrigerant outlet. The bead 41 is formed in the shape of a saddle so as to fit the shape of the outer circumferential surface of the expanded portion 7, and is brazed to the outer circumferential surface of the expanded portion 7. The bead 41 determines the insertion depth of the high-pressure-refrigerant inflow pipe 40.

A high-pressure-refrigerant inflow pipe 45 shown in FIG. 12 does not have a projection for determining the insertion depth of the high-pressure-refrigerant inflow pipe 45. A union nut 46 is rotatably attached to an end portion of the high-pressure-refrigerant inflow pipe 45. Meanwhile, a union screw 47, which has a flow path 47a and onto which the union nut 46 is screwed, is brazed to the expanded portion 7 of the outer tube 2 such that the flow path 47a communicates with the refrigerant inlet 9. As a result of the union nut 46 being screwed onto the union screw 47, the high-pressure-refrigerant inflow pipe 45 is removably connected to the outer tube 2 such that the high-pressure-refrigerant inflow pipe 45 communicates with the first refrigerant flow path 4.

Although not illustrated, the high-pressure-refrigerant outflow pipe may also have a structure as shown in FIG. 11 or 12.

In the above-described embodiment, the opposite end portions of the inner tube project from the opposite end portions of the outer tube. However, the present invention is not limited to such a structure, and the structure may be modified in such a manner that only one end portion of the inner tube projects from the outer tube.

What is claimed is:

1. A double-wall-tube heat exchanger comprising an outer tube, and an inner tube disposed in and spaced apart from the outer tube such that a clearance between the outer tube and the inner tube and the interior of the inner tube serve as respective refrigerant flow paths, wherein at least one end portion of the inner tube projects from the outer tube, and the outer tube includes an expanded portion which is formed near an end portion of the outer tube from which the inner tube projects, and a contracted portion which is formed on the outer side of the expanded portion with respect to a longitudinal direction, is smaller in diameter than the expanded portion, and is brazed to the inner tube, wherein the outer tube includes a plurality of ridges integrally provided on an inner circumferential surface thereof at predetermined intervals in a circumferential direction such that the ridges project radially inward and extend along the longitudinal direction; portions of the ridges which portions are present on inner circumferential surfaces of the expanded portion and the contracted portion of the outer tube are crushed; and clearances between an outer circumferential surface of the inner tube and inner circumferential surfaces of portions of the contracted portion of the outer tube where the ridges are not formed are filled with a brazing filler metal.

2. A double-wall-tube heat exchanger according to claim 1, wherein a portion of the outer tube located inward of the expanded portion with respect to the longitudinal direction has an outer diameter of 19 mm or greater, and relations $0.25 \leq h/t \leq 0.625$ and $0.72 \leq n/D1 \leq 0.96$ are satisfied, where t represents a wall thickness of the outer tube, D1 represents an inner diameter of the outer tube, h represents a height of the ridges, and n represents a number of the ridges.

3. A double-wall-tube heat exchanger according to claim 1, where a relation $1.23 \leq D2/D3 \leq 1.45$ is satisfied wherein D2 represents an outer diameter of the expanded portion of the outer tube, and D3 represents an outer diameter of a portion of the outer tube located inward of the expanded portion with respect to the longitudinal direction.

4. A double-wall-tube heat exchanger according to claim 1, wherein a clearance between distal ends of the ridges of the outer tube and an outer circumferential surface of the inner tube is 0 to 0.5 mm.

5. A double-wall-tube heat exchanger according to claim 1, wherein a cross-sectional area of the refrigerant flow path between the outer tube and the inner tube is equal to or greater than the area of a circle having a radius of 4.0 mm.

6. A double-wall-tube heat exchanger according to claim 1, wherein the outer tube has a wall thickness of 0.8 to 1.2 mm, and the ridges have a height of 0.3 to 1.1 mm.

7. A double-wall-tube heat exchanger according to claim 1, wherein the outer tube includes a conical portion formed between the expanded portion and the contracted portion such that the conical portion decreases in diameter from the expanded portion side toward the contracted portion side, and the brazing filler metal remains between the outer circumferential surface of the inner tube and an end portion of an inner circumferential surface of the conical portion, the end portion being located on the side toward the contracted portion.

8. A double-wall-tube heat exchanger according to claim 1, wherein opposite end portions of the inner tube project from the outer tube; and the expanded portion is formed at each of positions near the opposite ends of the outer tube.

* * * * *